(12) United States Patent
Hattori (10) Patent No.: US 10,069,387 B2
(45) Date of Patent: Sep. 4, 2018

(54) FIXING METHOD AND FIXING STRUCTURE FOR FIXING A COIL INSULATOR, STATOR USING THE SAME AND ROTATING ELECTRICAL MACHINE USING THE SAME

(71) Applicant: TOYOTA JIDOSHA KABUSHIKI KAISHA, Toyota-shi, Aichi-ken (JP)

(72) Inventor: Hiroyuki Hattori, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 219 days.

(21) Appl. No.: 14/914,980

(22) PCT Filed: Aug. 29, 2014

(86) PCT No.: PCT/IB2014/001639
§ 371 (c)(1),
(2) Date: Feb. 26, 2016

(87) PCT Pub. No.: WO2015/028876
PCT Pub. Date: Mar. 5, 2015

(65) Prior Publication Data
US 2016/0211733 A1 Jul. 21, 2016

(30) Foreign Application Priority Data
Aug. 30, 2013 (JP) .................................. 2013-179289

(51) Int. Cl.
*H02K 15/10* (2006.01)
*H02K 3/34* (2006.01)
(Continued)

(52) U.S. Cl.
CPC ............. *H02K 15/10* (2013.01); *H02K 3/345* (2013.01); *H02K 3/521* (2013.01); *H02K 3/522* (2013.01); *H02K 15/12* (2013.01); *H02K 2203/12* (2013.01)

(58) Field of Classification Search
CPC ........ H02K 15/00; H02K 15/02; H02K 15/10; H02K 15/12; H02K 3/34; H02K 3/345; H02K 3/46; H02K 3/52; H02K 3/522
See application file for complete search history.

(56) References Cited

U.S. PATENT DOCUMENTS 5,696,668 A * 12/1997 Zenitani ............... H05K 7/1418
361/741
2004/0124733 A1 7/2004 Yamamoto et al.
(Continued)

FOREIGN PATENT DOCUMENTS

JP 58-130751 A 8/1983
JP 2002-199627 A 7/2002
(Continued)

OTHER PUBLICATIONS

International Search Report and Written Opinion for PCT/IB2014/001639 dated Jun. 23, 2015.

*Primary Examiner* — Tran Nguyen
(74) *Attorney, Agent, or Firm* — Sughrue Mion, PLLC (57) ABSTRACT

A fixing method for fixing a coil insulator which is provided between a stator core 5 including a back yoke 7 and a plurality of teeth 8 projecting in the radial direction from the back yoke 7, and a coil 6 wound around the stator core 5, to the stator core 5, includes preparing the stator core 5 in which a fixing hole 11 is formed corresponding to a respective one of the teeth 8, on an end face in the axial direction of the back yoke 7, and preparing a plurality of coil insulators 12 which include each a main body 14 composed of a heat-softenable insulating material and arranged on the (Continued)

circumference of a respective one of the teeth 8, and a fixing portion 20 which is projected in the radial direction from the main body 14 and covers the fixing hole 11. Each coil insulator 12 is arranged on the circumference of a respective one of the teeth 8 by fitting thereto. By softening the fixing portion 20 by heating to bring part of the insulating material into the fixing hole 11 and then hardening the fixing portion 20, a projection 22 for fixing the coil insulator 12 to the stator core 5 is formed.

13 Claims, 7 Drawing Sheets

(51) Int. Cl.
*H02K 3/52* (2006.01)
*H02K 15/12* (2006.01)

(56) References Cited

U.S. PATENT DOCUMENTS

2005/0035680 A1* 2/2005 Murakami ............ H02K 1/148
310/216.069
2006/0147672 A1* 7/2006 Ruiz ................... B29C 45/0053
428/137

FOREIGN PATENT DOCUMENTS

| JP | 2009-044929 A | 2/2009 |
|---|---|---|
| JP | 2012-095492 A | 5/2012 |
| JP | 2013-038913 A | 2/2013 |

\* cited by examiner

FIXING METHOD AND FIXING STRUCTURE FOR FIXING A COIL INSULATOR, STATOR USING THE SAME AND ROTATING ELECTRICAL MACHINE USING THE SAME

BACKGROUND OF THE INVENTION

1. Field of the Invention

The present invention relates to a fixing method and a fixing structure for fixing a coil insulator which is provided between a stator core and a coil wound around the stator core, to the stator core in a rotating electrical machine.

2. Description of Related Art

Conventionally, there has been known a rotating electrical machine which includes a stator formed by winding a coil around teeth of the same stator and a rotor provided rotatably with respect to the stator across a gap. In such a rotating electrical machine, the coil wound around the stator is electrically insulated by interposing coil insulator composed of insulating material such as resin between the coil and the stator core, for example.

As a relevant related art document, Japanese Patent Application Publication No 2012-95492 (JP 2012-95492 A), for example, has described that in a stator of an electric motor, a coil insulator is arranged at each of both ends in the axial direction of a divided stator core section whose plan view in the axial direction is substantially letter-H shaped, a projection formed on each of the coil insulators is brought into a fixing hole formed in an axial end surface of a radially outside core rear portion of the divided stator core section and that, at the same time, a locking projection formed at a radially inside front end of each coil insulator is fitted to a radially inside front end face of a corresponding tooth portion of the divided stator core section, so that when a coil is wound around the tooth portion of the divided stator core section and the circumference of the coil insulator, the coil insulator is prevented from rotating with respect to the divided core.

However, according to the fixing method for fixing the coil insulator disclosed in the above-mentioned JP 2012-95492 A, the projections to be brought into the fixing holes formed in the axial end surfaces of the divided stator core sections are preliminarily formed on the coil insulators. Thus, when the insulators are installed to the divided stator core sections, the projections may be caught by the teeth or the like and damaged. Further, if a gap is formed between the projection of the coil insulator and the fixing hole in the divided stator core sections due to a dimensional error, the fixing condition of the coil insulator may be instable.

SUMMARY OF THE INVENTION

The present invention provides a fixing method and a fixing structure for fixing a coil insulator to a stator, which can prevent a fixing projection from being damaged when the coil insulator is assembled to a tooth of a stator core, and realizes a stable fixing condition without any looseness.

A fixing method according to the present invention is for fixing a coil insulator which is provided between a stator core of a rotating electrical machine and a coil wound around the stator core, to the stator core. The fixing method includes the steps of: preparing the stator core which includes an annular or substantially arc-shaped back yoke and a plurality of teeth projecting in the radial direction from the back yoke and in which at least one fixing hole is formed corresponding to a respective one of the teeth on an end face in the axial direction of the back yoke; preparing a plurality of coil insulators which are each to be provided on the circumference of a respective one of the teeth of the stator core, each coil insulator being composed of a heat-softenable insulating material and including a main body to be arranged on the circumference of respective one of the teeth and a fixing portion projecting in the radial direction from the main body and covering the at least one fixing hole; arranging the coil insulator on the circumference of the respective one of the teeth by fitting to respective one of the teeth; and softening the fixing portion by heating to bring part of the insulating material into the at least one fixing hole and then hardening the fixing portion to form at least one projection fixing the coil insulator to the stator core.

In the fixing method of the present invention, the at least one fixing hole may include a single fixing hole or a plurality of fixing holes, in particular a pair of fixing holes arranged in line in along a circumferential direction or a radial direction of the stator core. Furthermore, a heat-softenable insulating material is an insulating material, e.g. thermoplastic resin, which, when being heated, becomes soft, i.e. melts or softens, and, thereby, becomes able to flow. Further, the number of the at least one projection formed by softening and hardening the fixing portion, preferably corresponds to the number of the at least one fixing hole covered by the fixing portion. Preferably, when the fixing portion is softened as a result of being heated, it may at the same time being pressurized which may improve invasion of the molten insulating material into the at least one fixing hole.

According to the fixing method of the present invention, as described above, after the coil insulator is assembled to the respective one of the plurality of teeth of the stator core, the fixing projection is formed first by heating the fixing portion, i.e. the heat-softenable material constituting the coil insulator, whereby the fixing portion is softened and part of the insulating material is brought to invade the at least one fixing hole, and then by hardening the fixing portion. Thus, at the time of assembly, the fixing projection is never caught by the teeth and the like and damaged, and therefore the assembling property of the coil insulator is improved.

Further, if the insulating material is made to invade into the at least one fixing hole in the stator core, the at least one fixing projection obtained by hardening the fixing portion is fitted to the internal peripheral face of the at least one fixing hole without any gap. As a result, the coil insulator can be fixed to the stator core stably without any looseness.

Further, when softened insulating material invades into the at least one fixing hole and is hardened, it functions as an adhesive which attaches to the internal peripheral face of the at least one fixing hole. As a result, any resulting fixing projection is locked in the respective fixing hole more strongly than when it is just inserted or pressed in, so that the fixing strength of the coil insulator and the coil is intensified.

Further, because according to the fixing method of the present invention the fixing of the coil insulator to the stator core is completed with the coil insulator alone, no additional fixing member such as molding resin which covers the outside of the coil and the coil insulator is necessary. Because necessity of the fixing member such as the molding resin is eliminated, improvement of productivity of the stator, reduction of cost and improvement of heat radiation property of the coil can be achieved.

In the fixing structure resulting from the fixing method according to the present invention each fixing projection of the coil insulator is locked in the respective fixing hole formed in the back yoke of the stator core and fixed to the respective fixing hole. Thus, no structure which reduces the sectional area of the teeth serving as a magnetic flux path is adopted to fix the coil insulator. Thus, the magnetic property of the teeth is not affected. Further, if a fixing hole is formed on each of the two end sides in the axial direction of the back yoke, an influence on the magnetic property of the back yoke can be limited. Thus, the fixing method according to the present invention enables a coil insulator to be fixed to the stator core while substantially maintaining the magnetic property of the stator core.

In the fixing method of the present invention, the main body of the coil insulator may be formed into a cylinder for accommodating a respective one of the teeth, a fixing portion may be formed on each of both end sides in the axial direction of the coil insulator, and a fixing hole may be formed in each of the both end faces in the axial direction of the stator core.

Further, in the fixing method of the present invention, the fixing hole may be formed to widen from an end face in the axial direction of the stator core toward a deep side thereof.

Further, in the fixing method of the present invention, the coil insulator in which the coil is wound preliminarily around the main body before being fixed to the stator core may be fitted to the circumference of the respective one of the teeth from the front end side in the radial direction of the respective one of the teeth.

Further, in the fixing method of the present invention, at least one projection may be formed on each of both end sides in the axial direction of the stator core corresponding to a respective one of the teeth.

A fixing method with any of the above described aspects results in a fixing structure between a coil insulator and a stator core. The coil insulator is provided between a stator core and a coil wound around the stator core and is fixed to the stator core. The fixing structure includes: a stator core which includes an annular or substantially arc-shaped back yoke and a plurality of teeth projecting in the radial direction from the back yoke and in which at least one fixing hole is formed corresponding to a respective one of the teeth on an end face in the axial direction of the back yoke; a coil insulator to be provided on the circumference of a respective one of the teeth of the stator core, the coil insulator being composed of a heat-softenable insulating material and including a main body to be arranged on the circumference of the respective one of the teeth and a fixing portion projecting in the radial direction from the main body, wherein the fixing portion of the coil insulator contains at least one projection formed by softening the fixing portion by heating to bring part of the insulating material into the fixing hole and then hardening the fixing portion.

In the fixing structure of the present invention, the main body of the coil insulator may be formed into a cylinder for accommodating a respective one of the teeth, the fixing portion may be formed on each of both end sides in the axial direction of the coil insulator, and the fixing hole may be formed in each of the both end faces in the axial direction of the stator core.

Further, in the fixing structure of the present invention, the fixing hole may be formed to widen from an end face in the axial direction of the stator core toward the deep side thereof.

Further, in the fixing structure of the present invention, the coil insulator in which the coil is wound preliminarily around the main body before fixed to the stator core may be fitted to the circumference of the respective one of the teeth from the front end side in the radial direction of the teeth.

Further, in the fixing structure of the present invention, at least one projection may be formed on each of end sides in the axial direction of the stator core corresponding to a respective one of the teeth.

A fixing structure having any one of the above-described structures may be used for a stator of a rotary electrical machine, which includes besides the fixing structure a coil which is wound on the circumference of the main body of the coil insulator before or after the coil insulator is fitted to a respective one of the teeth of the stator core.

The present invention also relates to a rotating electrical machine which includes a stator having any of the above-described structures and a rotor which is opposed to the stator across a gap such that it is capable of rotating.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the present invention will be described in detail with reference to the accompanying drawings. In this description, a specific shape, material, numeral, direction and the like are exemplifications which facilitate understanding of the present invention and may be changed appropriately depending on a purpose, object, specification and the like. Further, if a plurality of embodiments or modifications are included in the description below, it is expected from the beginning that some characterizing portions thereof are combined appropriately for use.

Figure 1:
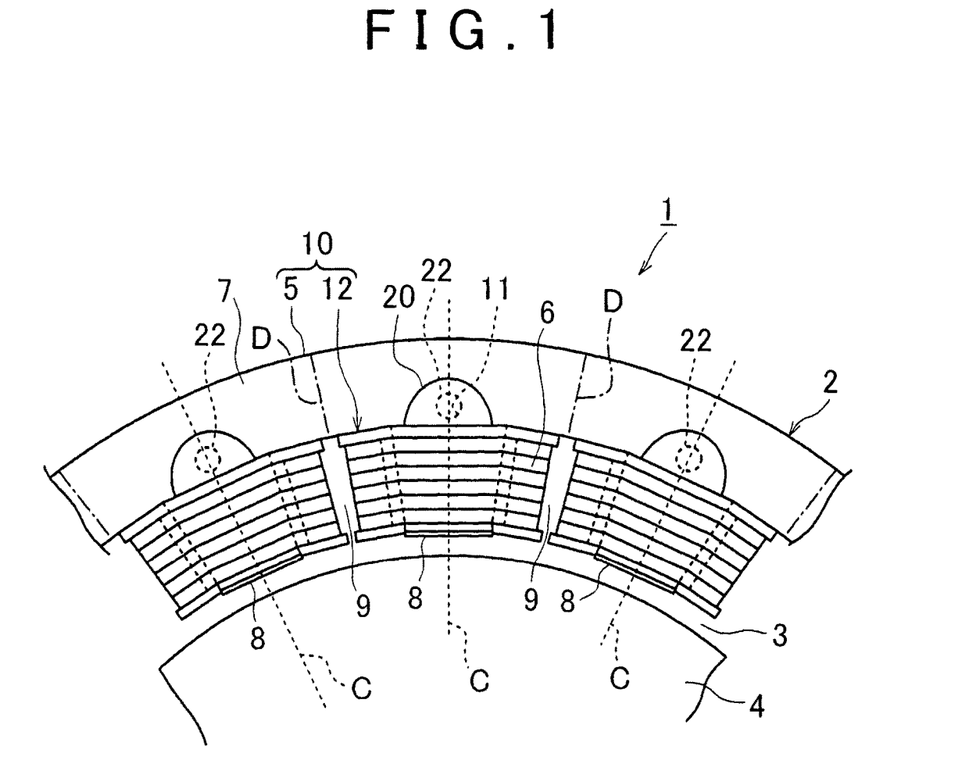
FIG. 1 is a partial end face view taken in the axial direction of a rotating electrical machine including a coil insulator fixing structure according to an embodiment of the present invention.

FIG. 1 is a partial end face view taken in the axial direction of a rotating electrical machine 1 including a coil insulator fixing structure 10 according to an embodiment of the present invention. The rotating electrical machine 1 includes a substantially cylindrical stator 2 and a rotor 4 provided inside in the radial direction of the stator 2 across a gap 3. The rotor 4 is supported rotatably in a casing (not shown) which accommodates the rotating electrical machine 1. The rotor 4 may be a rotor which includes a permanent magnet or a rotor which includes no permanent magnet.

The stator 2 includes a stator core 5, a coil insulator 12 and a coil 6 which is wound around the stator core 5. The stator core 5 and coil insulator 12 constitute a coil insulator fixing structure 10.

The stator core 5 is a multilayered body of magnetic sheet material constructed by stacking a number, of electromagnetic steel sheets, for example, which have been punched into a substantially annular and connecting them integrally by caulking, welding or the like. The stator core 5 includes a substantially annular back yoke 7 and a plurality of teeth 8 which are formed on the inside peripheral side of the back yoke 7 such that they each project inward in the radial direction and are located at a predetermined pitch in the circumferential direction. As a result, groove-like slots 9 are formed between the teeth 8 adjacent to each other in the circumferential direction such that they are open to both sides in the axial direction and inward in the radial direction.

In the present embodiment, each of the teeth 8 is formed in a substantially trapezoidal shape in plan view. Further, in the present embodiment, no protrusion in the circumferential direction is formed on any of the corners of a front end on the inside peripheral side of each of the teeth 8. As a result, the coil insulator 12 which includes a cylindrical space substantially agreeing with the external shape of the teeth 8 can be assembled by being fitted to a respective one of the teeth 8 from inside in the radial direction of the stator core 5.

In the stator core 5, a fixing hole 11 is formed in each of the end faces on both sides in the axial direction of the back yoke 7 and corresponding to a respective one of the teeth 8. The fixing hole 11 is a recess portion configured to fix the coil insulator 12 and the coil 6 to the stator core 5 when part of a heat-softenable insulating material constituting the coil insulator 12 invades into the fixing hole 11 to form a fixing projection.

The fixing hole 11 is constituted of a through hole formed in at least an electromagnetic steel sheet which constitutes the stator core 5. The depth of the fixing hole 11 is set to an extent capable of obtaining a locking condition necessary for securing a fixing strength of the coil insulator 12. The fixing hole 11 may be formed to pass through in the axial direction of the inside of the stator core 5. However, it is preferable to set the depth of the fixing hole 11 by considering influence on the magnetic property of the back yoke 7 of the stator core 5. Further, the fixing hole 11 is formed at a position which is covered by the fixing portion 20 of the coil insulator 12 when the coil insulator 12 is assembled to the teeth 8 as described below.

Further, the fixing hole 11 is formed on a straight line C along the radial direction passing through the center position in the circumferential direction of the teeth 8 (hereinafter referred to as a center line in the circumferential direction). Although in the present embodiment, the fixing hole 11 is formed as a circular hole, it is not restricted to this example, but may be formed as other shape hole, for example, a rectangular hole, elliptical hole and the like.

In the meantime, although the stator core 5 in the present embodiment will be described in an assumption that it is formed as an integrated annular magnetic sheet multilayered body, it may be constituted of divided stator core sections such that the back yoke 7 is divided at both sides of the teeth 8 with a predetermined interval in the circumferential direction as shown with a dot and dash, line D in FIG. 1. In this case, a divided stator core section has a substantially letter-T shape in plan view in the axial direction, with its substantially arc-shaped back yoke and teeth. The stator core 5 may be constructed such that the divided stator core sections are connected integrally by arranging the divided cores annularly and then, mounting a cylindrical case on an external periphery of the arranged divided cores by shrink fitting, press fitting or the like. Further, the stator core 5 may be formed as a dust stator core which is produced by compression-molding resin-coated magnetic dust by means of a mold.

The coil 6 is constructed by winding a conductive wire which is an insulation-coated copper wire, for example, around the coil insulator 12. In the present embodiment, the coil 6 is wound around each of the teeth according to concentrated winding method. The section of the conductive wire which constructs the coil 6 may be circular (see FIG. 5 and the like) or angular.

The coil insulator 12 has a function of insulating the stator core 5 from a respective coil 6 electrically. In addition, according to the present embodiment, the coil insulator 12 has also a function of fixing a respective coil 6 to the stator core 5.

The coil insulator 12 is formed of a heat-softenable insulating material, for example, resin. As a result, the stator core 5 and the coil 6 can be insulated excellently between one and another. More specifically, the coil insulator 12 is formed of thermoplastic resin, for example, polyphenylene sulfide (PPS). Such formation thereof with thermoplastic resin allows resin material to invade into the fixing hole in the stator core 5 when a fixing portion of the coil insulator 12 is heated and pressurized to form a fixing projection as described below.

Figure 2:
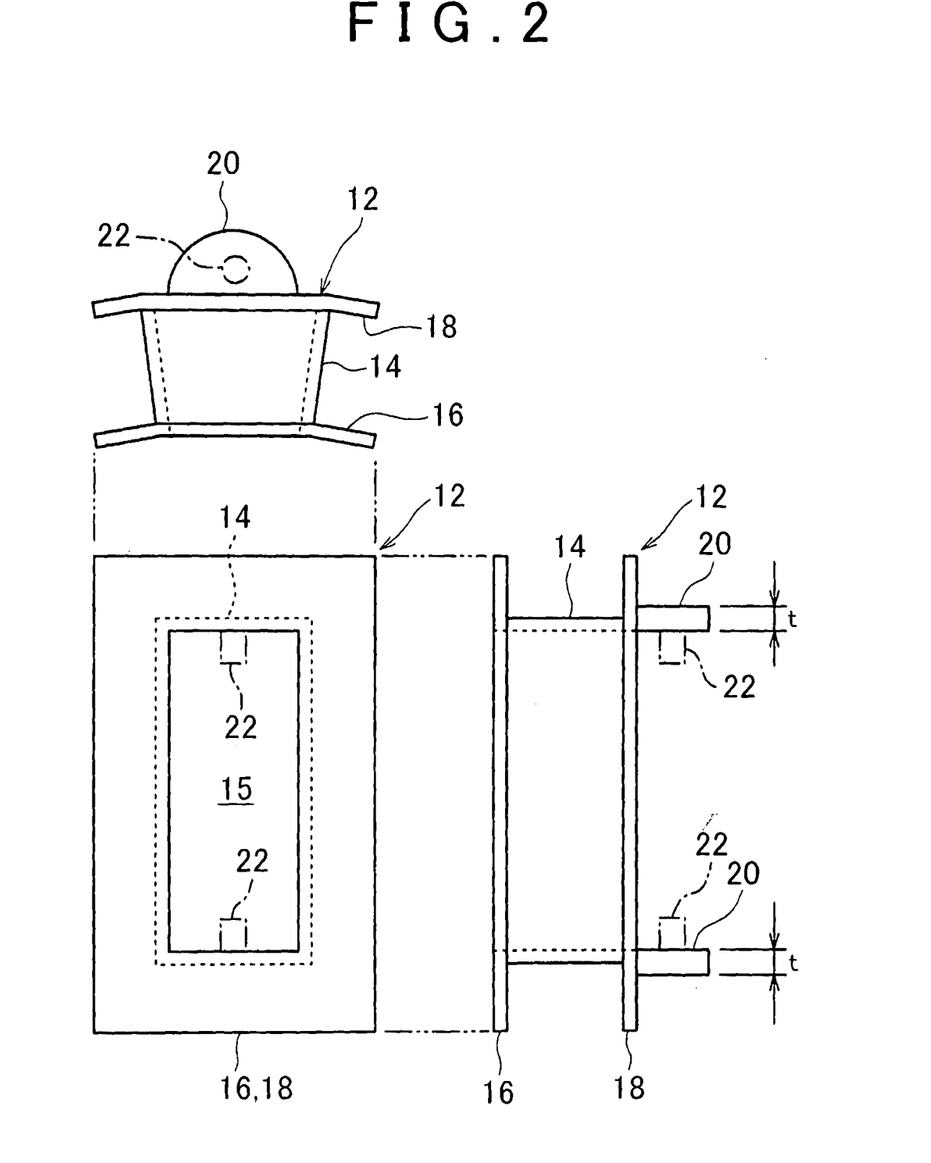
FIG. 2 shows a top view, a front view and a side view of the coil insulator, the top view and the side view being expressed on the top and the right respectively with respect to the front view.

FIG. 2 is a top view, a front view, and a side view of the coil insulator 12. The coil insulator 12 includes, a rectangular cylindrical main body 14, first and second flange portions 16, 18 formed on both ends in the axial direction of the main body 14 such that they project in the circumferential direction, and a fixing portion 20 provided protrudedly on the external side face of the second flange portion 18. The coil insulator 12 can be formed integrally with a mold using thermoplastic resin. The main body 14 of the coil insulator 12 constructs a bobbin for winding the coil 6 around the circumference of a respective one of the teeth 8 in an insulating condition together with the first and second flange portions 16, 18.

An inside space 15 in the main body 14 of the coil insulator 12 is formed in a shape and size capable of accommodating a respective one of the teeth 8 which are of a substantially trapezoid in plan view substantially without any gap. As a result, when the coil insulator 12 is arranged on the circumference of a respective one of the teeth 8, it can be arranged such that the internal peripheral face of the main body 14 is fitted to the external peripheral face of the respective tooth 8. Further, as shown in FIG. 1, the length of the main body 14 in the radial direction is defined to be slightly smaller than the respective tooth 8. As a result, when the coil insulator 12 is fitted to the respective tooth 8, the front end of the respective tooth 8 projects slightly from the main body 14.

As shown in FIG. 2, the first and second flange portions 16, 18 of the coil insulator 12 are respectively formed in the shape of a rectangular frame in plan view. Further, the distal edges on both sides in the circumferential direction of each of the first and second flange portions 16, 18 are formed to be bent at a predetermined angle with respect to the section of the main body 14 in the axial direction. As a result, when the coil insulator 12 is assembled to a respective one of the teeth 8, the second flange portion 18 located outside in the radial direction comes into contact with the internal peripheral curved surface of the back yoke 7 located between adjacent teeth 8 thereby stabilizing the arrangement of the coil insulator 12. Further because the first flange portion 16 is bent to be substantially parallel to the second flange portion 18, a large coil winding space can be secured between the first, second flange portions 16 and 18. As a result, the space factor which is occupied by the coil 6 in the slot 9 can be improved to reduce copper loss of the coil 6.

As shown in FIGS. 1, 2, the fixing portion 20 of the coil insulator 12 is formed to project from the surface outside in the radial direction of the second flange portion 18 substantially in a semicircular shape. A fixing portion 20 is formed on each of the two end sides in the axial direction of the coil insulator 12 such that they are apart from each other at a distance equivalent to the length of the teeth 8 in the axial direction. As a result, when the coil insulator 12 is assembled to the respective tooth 8, the fixing portions 20 are arranged on the end surfaces in the axial direction of the stator core 5 such that they are substantially in contact therewith.

Further, the thickness t of each fixing portion 20 of the coil insulator 12 is defined to be larger than that of the main body 14 or the first and second flange portions 16, 18. The thickness t of the fixing portions 20 is defined preliminarily to be larger by considering that when the fixing projections 22 are formed by heating and pressurizing the fixing portions 20 as described below, part of thermoplastic resin material constituting the fixing portions 20 invades into the fixing holes 11 in the stator core 5. Because the amount of resin which invades changes depending on the size and the depth of the fixing holes 11, the initial thickness t of the fixing portions 20 is preliminarily set up to such an extent that the fixing portions 20 can secure and maintain the fixing strength of the coil insulator 12 and the coil 6 after the fixing projections 22 are formed.

Figure 3:
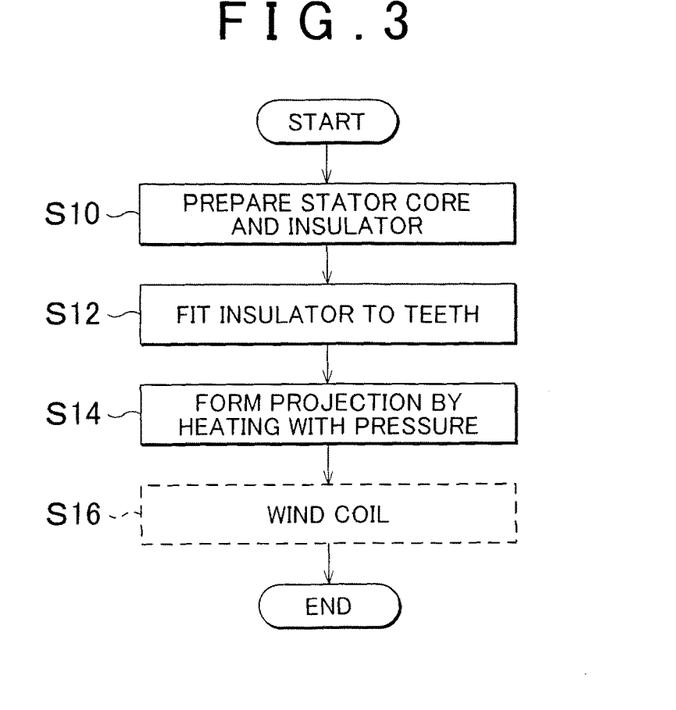
FIG. 3 is a flow chart showing a fixing method according to the present invention.
Figure 4:
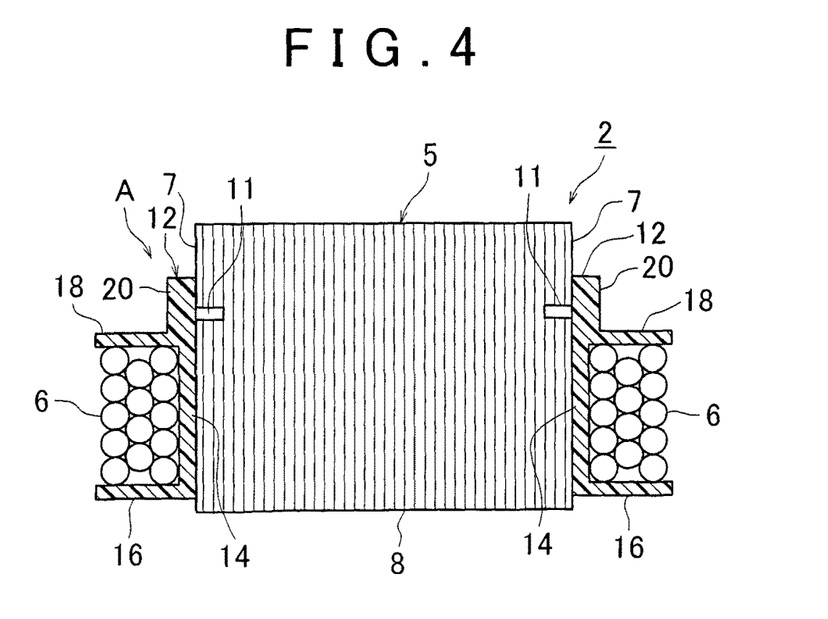
FIG. 4 is a sectional view taken along the axis of the stator showing a state in which a coil insulator around which a coil is wound is fitted to a tooth of a stator core.
Figure 5:
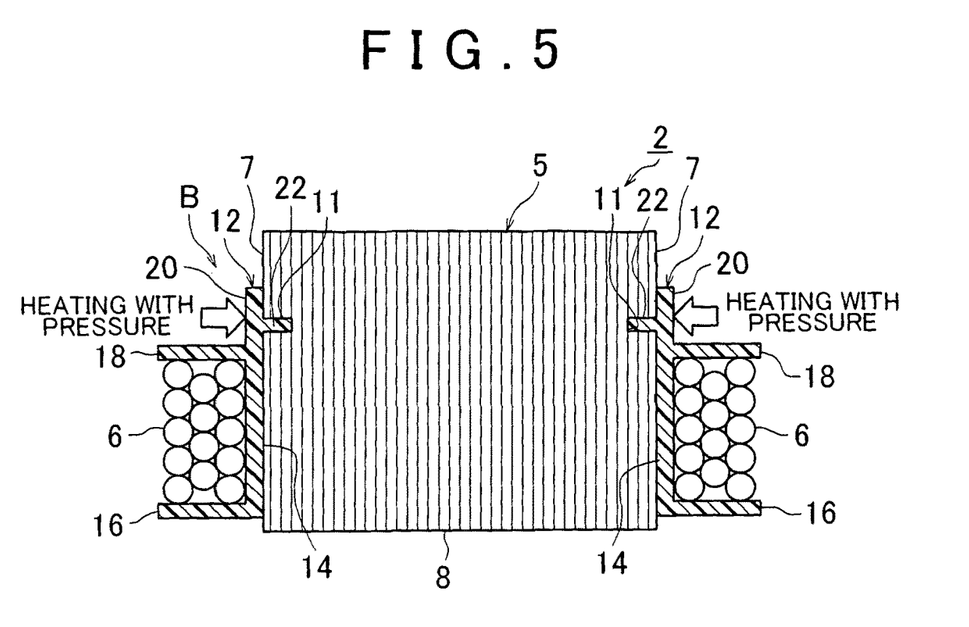
FIG. 5 is a sectional view taken along the axis of the stator showing a state in which a fixing projection is formed by heating and pressurizing a fixing portion of the coil insulator.

Subsequently, the fixing method of the coil insulator 12 to the stator core 5 will be described with reference to FIGS. 3 to 5. This fixing method can be said to be a manufacturing method of the coil insulator fixing structure 10. FIG. 3 is a flow chart showing a fixing method of the coil insulator 12. FIG. 4 is a sectional view taken along the axis of the stator 2 showing a state in which the coil insulator 12 around which the coil 6 is wound is fitted to a tooth 8 of the stator core 5. FIG. 5 is a sectional view taken along the axis of the stator 2 showing a state in which the fixing projections 22 are formed by heating and pressurizing the fixing portions 20 of the coil insulator 12.

By referring to FIG. 3, in step S10, first, the stator core 5 and the coil insulator 12 are prepared. The coil 6 has been preliminarily wound around the coil insulator 12.

Next, in step S12, the coil insulator 12 is assembled by being fitted to the tooth 8 of the stator core 5 from the front end side in the radial direction of the teeth 8 as shown in FIG. 4. At this time, the second flange portion 18 is brought into contact with the bottom face or the internal peripheral face in the radial direction of the slot 9.

Then, in step S14, a heating member (not shown) is pressed to the fixing portions 20 of the coil insulator 12 from both sides in the axial direction. As a result, the fixing portions 20 are heated to at least glass transition temperature (Tg) or more and pressurized by the heating member. At this time, if the fixing portions 20 are softened to such an extent that they can flow into the respective fixing hole 11, they do not have to be heated up to the melting point. However, the fixing portions 20 may be in a molten state by being heated beyond the melting point. The fixing portions 20 are softened or melted as a result of being heated and pressurized, so that part of insulating resin material which constitutes the respective fixing portion 20 invades into the respective fixing hole 11 in the stator core 5.

As described above, the stator core 5 is constituted of multilayered body of electromagnetic steel sheets. Thus, when softened resin material invades into the fixing holes 11, air inside the fixing holes 11 can escape through a fine gap between the steel sheets. Thus, no softened resin material is blocked from invasion by air existing inside the fixing holes 11.

By hardening resin material which has invaded into the fixing holes 11 in this way, the fixing projections 22 locked in the fixing holes 11 are integrated with the coil insulator 12. As a result, the coil insulator 12 and the coil 6 wound around this are fixed to the stator core 5. Here, hardening of resin material may be achieved by natural cooling or forced cooling.

In the present embodiment, as described above, after the coil insulator 12 is assembled to the tooth 8 of the stator core 5, the fixing projections 22 are formed. Thus, at the time of assembly, the fixing projections 22 are never caught by a tooth and the like and damaged, and therefore the assembling property of the coil insulator 12 is improved.

Further, because after heated and softened insulating resin material invades into the fixing holes 11 in the stator core 5, the fixing projections 22 are formed by hardening, the fixing projections 22 can be fitted to the internal peripheral face of the fixing holes 11 without any gap. As a result, the coil insulator 12 can be fixed to the stator core 5 stably without any looseness.

Further, when softened or molten resin material invades into the fixing holes 11 and is hardened, it functions as an adhesive which attaches to the internal peripheral face of the fixing holes 11. As a result, the fixing projections 22 are locked in the fixing holes 11 more strongly than when they are just inserted or pressed in, so that the fixing strength of the coil insulator 12 and the coil 6 is intensified.

Further, because in the present embodiment, the fixing of the coil insulator 12 to the stator core 5 is completed with the coil insulator 12 alone, no additional fixing member such as molding resin which covers the outside of the coil and the coil insulator is necessary. Because necessity of the fixing member such as the molding resin is eliminated, improvement of productivity of the stator 2, reduction of cost and improvement of heat radiation property of the coil 6 can be achieved.

In the fixing structure 10 of the coil insulator 12 according to the present embodiment, the fixing projections 22 of the coil insulator 12 are locked in the fixing holes 11 formed in the back yoke 7 of the stator core 5 and fixed to the fixing holes 11. Thus, no structure which reduces the sectional area of the teeth 8 serving as a magnetic flux path is adopted to fix the coil insulator 12. Thus, the magnetic property of the teeth 8 is not affected. Further, because the fixing holes 11 are formed on the both end sides in the axial direction of the back yoke 7, influence on the magnetic property of the back yoke 7 is, limited. Thus, the coil insulator fixing structure 10 of the present embodiment enables the coil insulator 12 to be fixed to the stator core 5 while substantially maintaining the magnetic property of the stator core 5. Further, the fixing structure 10 of the coil insulator 12 allows to obtain a large space in which the coil 6 is to be arranged because it never reduces the sectional area of the slot 9. As a result, maintenance or improvement of torque generation efficiency of the rotating electrical machine 1 can be achieved.

Next, a modification of the above-described embodiment will be described with reference to FIGS. 6 to 11.

Figure 6:
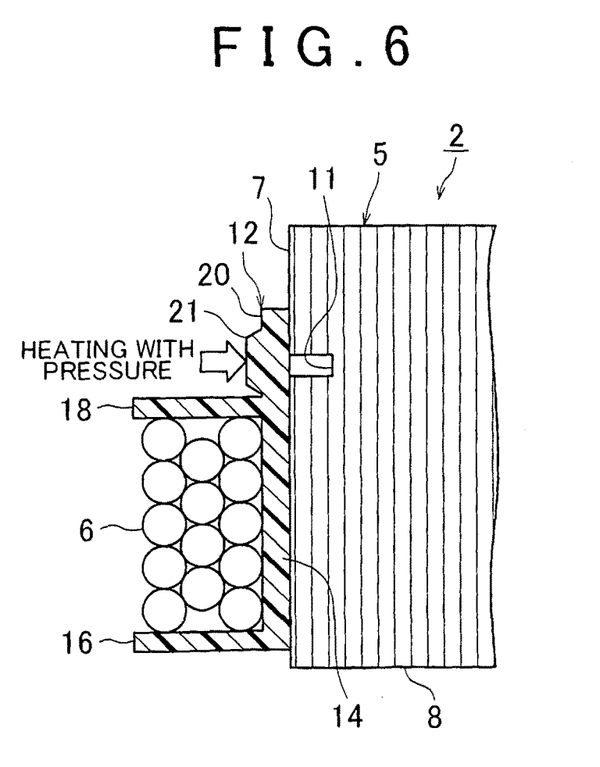
FIG. 6 is an enlarged view of a section A in FIG. 4 showing a modification of the fixing portion of the coil insulator.

FIG. 6 is an enlarged view of a section A in FIG. 4 showing a modification of the fixing portion 20 of the coil insulator 12. Although it is described above that the thickness t of the fixing portions 20 of the coil insulator 12 is defined to be larger than the main body 14 and the first, second flange portions 16, 18, only a region of each fixing portion 20, which is to be heated by the heating member (not shown) may be formed to be thicker such that it projects in the shape of a truncated cone, for example, while other regions of each fixing portion 20 may be formed in the same thickness as the main body 14 and the like. As a result, there is produced an advantage that resin material which constitutes a fixing portion 20 can be reduced.

Figure 7:
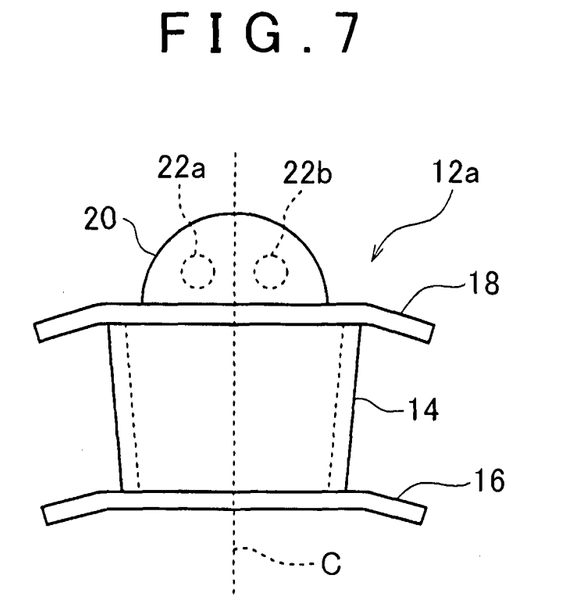
FIG. 7 is a top view of the coil insulator showing a modification of the coil insulator in which a plurality of fixing projections are formed in line along the circumferential direction.
Figure 8:
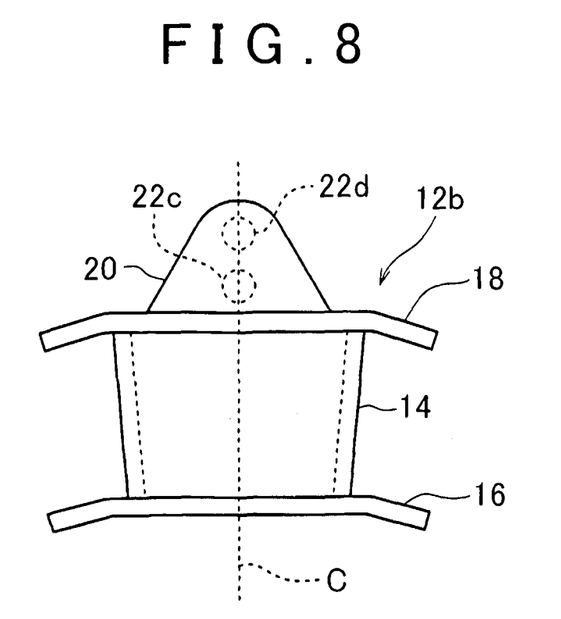
FIG. 8 is a top view of the coil insulator showing a modification of the coil insulator in which a plurality of fixing projections are formed in line along the radial direction.

FIGS. 7, 8 are a top view of the coil insulator showing a modification in which a plurality of the fixing projections 22a, 22b are formed on a single fixing portion 20. Although it is described above that in the fixing portion 20 of the coil insulator 12, a single fixing projection 22 is formed on each of end sides in the axial direction, the present embodiment is not restricted to this example, but a plurality of fixing projections 22 may be provided on a single fixing portion 20. For example, as in a coil insulator 12a shown in FIG. 7, two fixing projections 22a, 22b may be symmetrically arranged with respect to a center line C with respect to the circumferential direction or as in a coil insulator 12b shown in FIG. 8, two fixing projections 22c, 22d may be formed in a line on the center line C with respect to the circumferential direction or three fixing projections may be arranged in a triangular shape. In case where a plurality of the fixing projections are formed in line in the radial direction as shown in FIG. 8, the shape, the size thereof or the projection length may be differentiated between one and another, for example, a fixing projection 22d outside in the radial direction may be formed thick while a fixing projection 22c inside in the radial direction may be formed thin.

Figure 9:
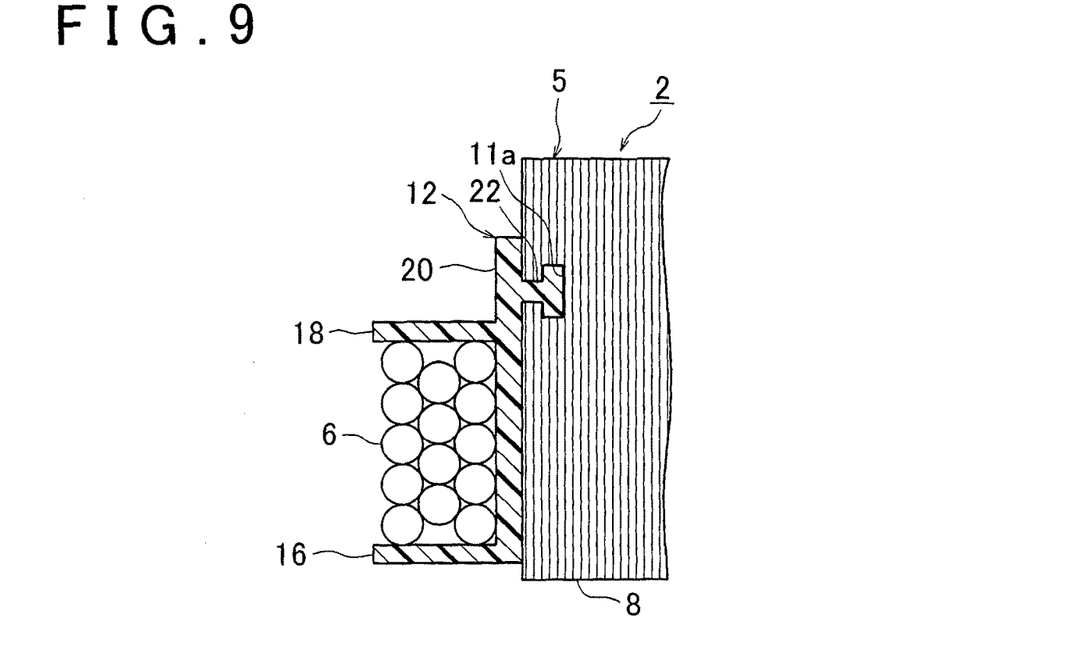
FIG. 9 is an enlarged view of a section B in FIG. 5 showing a modification in which the fixing hole is formed such that its deep portion in the axial direction widens in a substantially letter-T shape.
Figure 10:
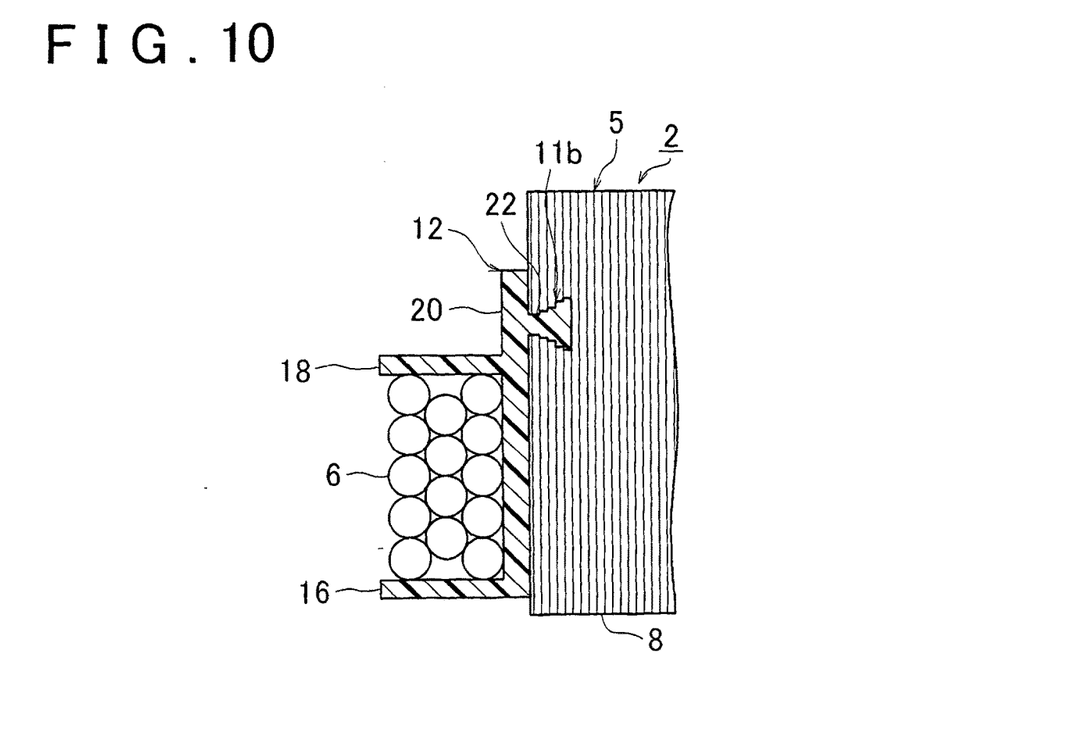
FIG. 10 is an enlarged view of a section B in FIG. 5 indicating a modification in which the fixing hole is formed such that its deep portion in the axial direction widens in a staircase-like shape.

FIGS. 9, 10 are an enlarged view of a section B in FIG. 5 showing a modification in which a fixing hole 11 is formed such that its deep portion in the axial direction widens in a radial direction. As shown in FIG. 9, the fixing hole 11 may be formed such that its deep portion in the axial direction widens substantially in a letter-T shape and alternatively, as shown in FIG. 10, the fixing hole 11 may be formed such that its deep portion in the axial direction widens in a staircase-like shape (or in a tapered shape). By widening the deep portion of each of the fixing holes 11a, 11b, the fixing projection 22 formed with resin invading therein is expected to fix the coil insulator 12 firmly due to the anchor effect.

Figure 11:
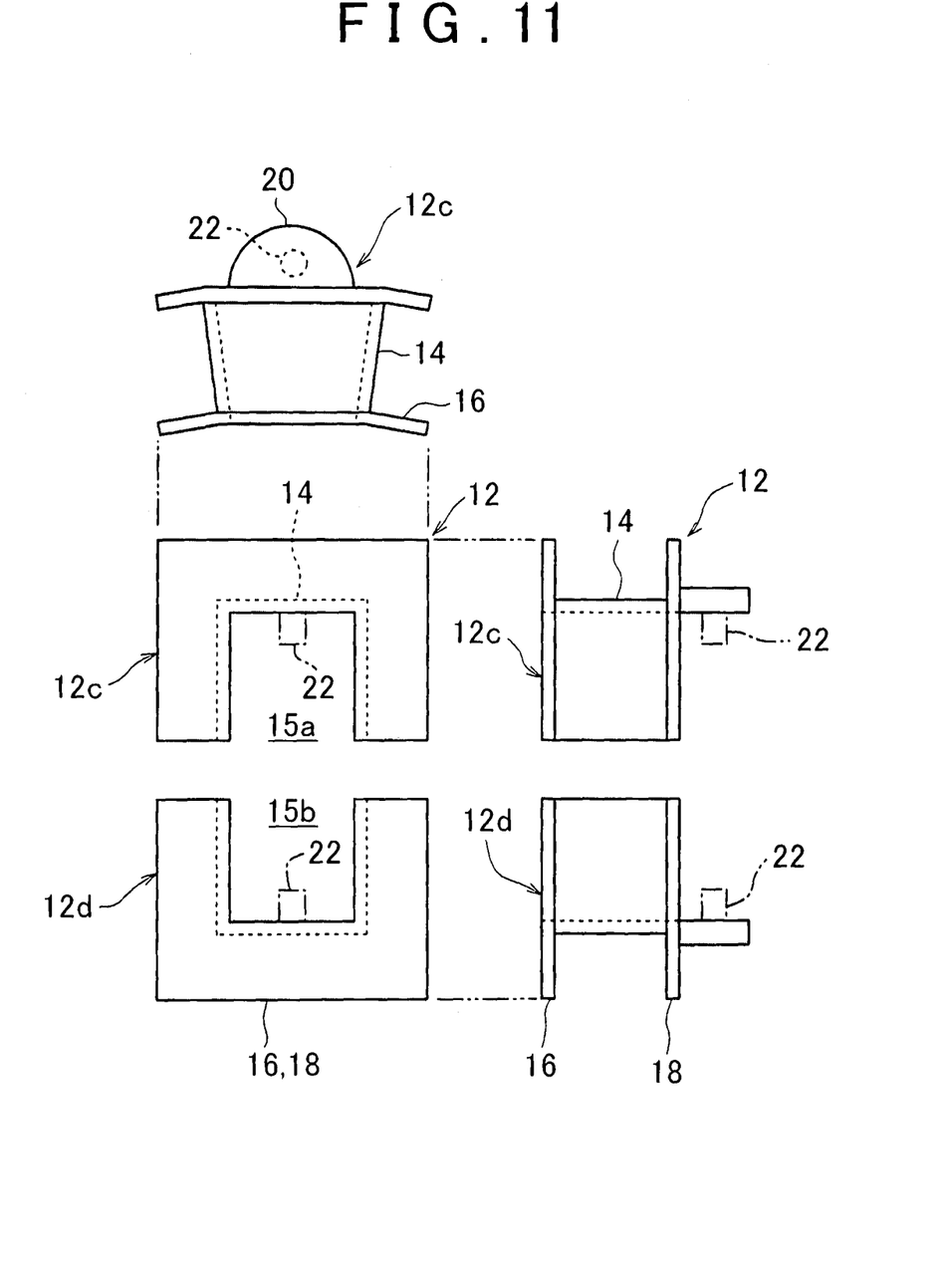
FIG. 11 shows a similar top view, a front view and a side view to FIG. 2 indicating a coil insulator which is divided into two sections with respect to the axial direction.

FIG. 11 shows a top view, front view and side view like in FIG. 2 of the coil insulator 12 which is divided into two sections with respect to the axial, direction. Although it is described above that the coil insulator 12 is formed entirely integrally such that the main body 14 is a rectangular cylinder, the present invention is not restricted to this example. As shown in FIG. 11, the coil insulator 12 may be divided into two sections, i.e., a first coil insulator section 12c which is arranged on one side in the axial direction of the tooth 8 and a second coil insulator section 12d which is arranged on the other side in the axial direction of the same tooth 8. In case where a protrusion which protrudes in the circumferential direction is formed at each corner of the front end inside in the radial direction of the tooth 8, such division enables the first and second coil insulator sections 12c, 12d to be fitted to the tooth 8 along the axial direction and arranged thereon. In this case, after the coil insulator portions 12c, 12d are fitted to the tooth 8 and arranged thereon, the fixing projections 22 are formed. After that, the coil 6 is wound around the circumference of the main body 14 of the coil insulator 12 (see step S16 in FIG. 3).

In the meantime, the fixing structure of the coil insulator according to the present invention is not restricted to the structures of the above-described embodiments and modifications, but may be improved or altered in various ways within matters described in claims of the present application and an equivalent range thereto.

For example, although it is described above that the fixing projections 22 are formed by heating and pressurizing the fixing portions 20 of the coil insulator 12, it is permissible to perform only heating without pressurizing if part of softened resin material which constitutes the fixing portions 20 can invade into the fixing holes 11 of the stator core 5.

The invention claimed is:

1. A fixing method for fixing a coil insulator to a stator core, the coil insulator provided between a stator core and a coil, the stator core including an annular or substantially arc-shaped back yoke and a plurality of teeth projecting in a radial direction from the back yoke, the coil being wound around the stator core, the fixing method comprising:
    preparing the stator core in which at least one fixing hole is formed corresponding to a respective one of the teeth, on an end face in an axial direction of the back yoke;
    preparing the coil insulator, the coil insulator being provided on a circumference of the respective one of the teeth of the stator core, the coil insulator being composed of a heat-softenable insulating material, the coil insulator including a main body to be arranged on a circumference of the respective one of the teeth and a fixing portion projecting in the radial direction from the main body, and the fixing portion that covers the at least one fixing hole;
    arranging the coil insulator on the circumference of the respective one of the teeth by fitting to the respective one of the teeth; and
    softening by heating the fixing portion to bring part of the insulating material into the at least one fixing hole and then hardening the fixing portion to form at least one projection fixing the coil insulators to the stator core.

2. The fixing method according to claim 1, wherein
    the main body is formed into a cylinder for accommodating the respective one of the teeth; wherein
    the fixing portion is formed on each of both end sides in an axial direction of the coil insulator; and wherein
    the at least one fixing hole is formed in each of the both end faces in an axial direction of the stator core.

3. The fixing method according to claim 1, wherein
    the at least one fixing hole is formed such that the fixing hole widens from an end face in an axial direction of the stator core.

4. The fixing method according to claim 1, wherein
the coil insulator in which the coil is wound preliminarily around the main body before being fixed to the stator core is fitted to the circumference of the respective one of the teeth from a front end side in the radial direction of the respective one of the teeth.

5. The fixing method according to claim 1, wherein
at least one projection is formed on each of both end sides in an axial direction of the stator core, corresponding to the respective one of the teeth.

6. The fixing method according to claim 1, wherein
the fixing portion of the coil insulator is softened by heating and at the same time, the fixing portion of the coil insulator is pressurized.

7. A fixing structure for fixing a coil insulator to a stator core, the coil insulator provided between a stator core and a coil, the stator core being provided with an annular or substantially arc-shaped back yoke and a plurality of teeth projecting in a radial direction from the back yoke, and the coil being wound around the stator core, the fixing structure comprising:
the stator core having at least one fixing hole which is formed corresponding to a respective one of the teeth on an end face in the axial direction of the back yoke; and
the coil insulator provided on the circumference of a respective one of the teeth of the stator core, the coil insulator being composed of a heat-softenable insulating material, the coil insulator including a main body arranged on the circumference of the respective one of the teeth and a fixing portion projecting in the radial direction from the main body, and the fixing portion that covers the at least one fixing hole, wherein
the fixing portion of the coil insulator contains at least one projection which has been formed by softening the fixing portion by heating to bring part of the insulating material into the at least one fixing hole and then hardening the fixing portion.

8. The fixing structure according to claim 7, wherein
the main body of the coil insulator is formed into a cylinder for accommodating a respective one of the teeth; wherein
the fixing portion is formed on each of both end sides in an axial direction of the coil insulator; and wherein
the fixing hole is formed in each of the both end faces in an axial direction of the stator core.

9. The fixing structure according to claim 7, wherein
the at least one fixing hole is formed such that the fixing hole widens from an end face in an axial direction of the stator core.

10. The fixing structure according to claim 7, wherein
at least one projection is formed on each of end sides in an axial direction of the stator core, corresponding to the respective one of the teeth.

11. A stator comprising:
a fixing structure including:
a stator core provided with an annular or substantially arc-shaped back yoke and a plurality of teeth projecting in a radial direction from the back yoke, the stator having at least one fixing hole which is formed corresponding to a respective one of the teeth on an end face in the axial direction of the back yoke;
a coil insulator provided on the circumference of a respective one of the teeth of the stator core, the coil insulator being composed of a heat-softenable insulating material, the coil insulator including a main body arranged on the circumference of the respective one of the teeth and a fixing portion projecting in the radial direction from the main body, the fixing portion that covers the at least one fixing hole, and the fixing portion containing at least one projection which has been formed by softening the fixing portion by heating to bring part of the insulating material into the at least one fixing hole and then hardening the fixing portion; and
a coil wound on a circumference of the main body of the coil insulator, the coil insulator provided between the stator core and the coil.

12. A rotating electrical machine comprising:
a stator comprising:
a fixing structure including:
a stator core provided with an annular or substantially arc-shaped back yoke and a plurality of teeth projecting in a radial direction from the back yoke, the stator having at least one fixing hole which is formed corresponding to a respective one of the teeth on an end face in the axial direction of the back yoke;
a coil insulator provided on the circumference of a respective one of the teeth of the stator core, the coil insulator being composed of a heat-softenable insulating material, the coil insulator including a main body arranged on the circumference of the respective one of the teeth and a fixing portion projecting in the radial direction from the main body, the fixing portion that covers the at least one fixing hole, and the fixing portion containing at least one projection which has been formed by softening the fixing portion by heating to bring part of the insulating material into the at least one fixing hole and then hardening the fixing portion; and
a coil wound on a circumference of the main body of the coil insulator, the coil insulator provided between the stator core and the coil; and
a rotor opposed to the stator across a gap such that the rotor is rotatable.

13. The fixing method according to claim 1, wherein
the fixing portion is arranged on an end surface of the stator core in the axial direction such that the fixing portion is substantially in contact with the end surface of the stator core when the coil insulator is fitted to the respective one of the teeth.

* * * * *